United States Patent Office 3,711,557
Patented Jan. 16, 1973

3,711,557
PROCESS FOR OXIDIZING CYCLOALIPHATIC HYDROCARBONS IN THE LIQUID PHASE AND RELEVANT APPARATUS
Gastone Bartalini, Nedo Brischetto, and Mario Giuggioli, Novara, Italy, assignors to Societa Rhodiatoce S.p.A., Milan, Italy
Filed Dec. 5, 1969, Ser. No. 882,435
Claims priority, application Italy, Dec. 12, 1968, 24,967/68
Int. Cl. C07c 27/12
U.S. Cl. 260—617 H
6 Claims

ABSTRACT OF THE DISCLOSURE

Cycloaliphatic hydrocarbons are continuously oxidized in liquid-phase by molecular oxygen in the presence of at least a boron compound insoluble in the reaction medium wherein a portion of the crude reaction mixture, before being conveyed to the subsequent processing steps, is subjected to a clarification process, wherein substantially all the excess insoluble boron compound is separated and recycled into the reactor together with the remaining portion of the crude reaction mixture, the clarified portion being sent to the subsequent processing steps according to techniques known per se.

---

This invention relates to an improved process for the continuous, liquid-phase oxidation of saturated cycloaliphatic hydrocarbons, by molecular oxygen and/or gases containing it, and in the presence of boron compounds. More particularly, this invention relates to an improved process for obtaining mixtures of cycloaliphatic alcohols and ketones having a high alcohol content. Such mixtures are most valuable industrial products useful, for example, in the preparation of intermediate products for polyamide fibers, such as adipic acid, caprolactam, etc.

Several processes are already known for obtaining mixtures of alcohols and ketones, these processes being based on the partial liquid-phase oxidation of saturated, and more particularly, cycloaliphatic hydrocarbons. Some of these processes have recently turned out to be of considerable industrial interest, namely those based on the use of boron compounds which, as long known in the art, make it possible to obtain substantially improved yields of the required alcohol, since by using such compounds it it possible to block the alcohols produced by the oxidation in the form of boric esters and thus to protect them, as such, against further undesired oxidizing actions. By way of example may be mentioned the process for preparing alcohols by liquid-phase oxidation of paraffins or waxes, with air and in the presence of orthoboric acid or boric anhydride.

The use of orthoboric acid in the liquid-phase oxidation of cyclododecane has been described in a similar process, wherein the molar yields are in the order of magnitude of 90% in cyclododecanol and cyclododecanone mixtures and the alcohol:ketone ratio is about 10.

More recently, the use of orthoboric acid or other boron derivatives and, particularly, metaboric acid or other less hydrated forms of orthoboric acid, has been described also in connection with the liquid-phase oxidation of cyclohexane.

The latter processes proved to be particularly valuable in practice, since they make it possible to obtain molar yields in alcohol:ketone mixtures which remarkably exceed those obtainable according to processes which do not include the use of boron compounds.

The industrial application of the aforesaid processes, however, involves some drawbacks which restrict their actual possibilities to a large extent.

Such restrictions substantially depend on the fact that in order to obtain high yields in the desired products, it is necessary to use a quantity of boron compound largely exceeding that required by the stoichiometric ratio of the reaction. For economy of the process, it is self-evident therefore that all of the boron compound used in the process must be recovered and recycled in order to limit the losses thereof as much as possible.

Now, as is well-known to those skilled in the art, all processes of this kind include, at the end of the oxidation, the hydrolysis (either with water or with aqueous solutions of $H_3BO_3$) of the reaction product, in order to separate the alcohol which is present in the form of boric ester and to recover the boron compound.

By the hydrolysis the boron compounds are recovered in the form of orthoboric acid and, since the boron compounds which are most active in the oxidation of hydrocarbons are known to be metaboric acid and the other less hydrated forms of orthoboric acid, the recovered orthoboric acid has to be subjected to a partial dehydration before being recycled into the oxidation stage of the process.

The operations of recovery and dehydration of the boron compounds involve significant and burdensome operational complications in the plants. In the processes of this type known so far, the crude reaction mixture, as discharged from the oxidation reactor and subjected to hydrolysis before being sent to the following processing stages, contains all the boron compound introduced in the cycle, both that bound to the alcohol in the form of an ester, and that in excess. All the boron has to be recovered in order to be reprocessed and recycled and, since large quantities are involved (the boron atoms ratio versus moles of alcohol produced is generally remarkably higher than 1), not only the difficulties in the required recovery operations, but also their remarkable burden from an economical point of view become self-evident.

A further drawback arises from the fact that deposits and/or cloggings are easily formed since the boron compounds usually employed (ortho- and metaboric acid, boric anhydride) are practically insoluble in the reaction medium.

Processes are known wherein the amounts of boron compound are strictly limited to the quantity necessary to esterify the produced alcohol, but in such processes the yield in useful products is considerably lower.

Other processes are also known wherein boric esters soluble in the reaction medium are used (cyclohexyl metaborate, for example, in the case of cyclohexane oxidation); however, while on the one hand this expedient seems to obviate the drawbacks arising from the insolubility of the other boron compounds in the reaction medium, nevertheless this causes, on the other hand, a further technical and economical burden owing to the fact that it is necessary to prepare separately the boric ester which is to be recycled into the oxidation stage.

Accordingly, it is an object of the present invention to provide an improved, simple, and inexpensive process for the continuous liquid-phase oxidation of saturated cycloaliphatic hydrocarbons, by molecular oxygen and/or gases containing same, and in the presence of boron compounds, which shall be free from the above cited drawbacks.

A further object consists in providing an apparatus particularly suitable for an easier practice of the process.

Other objects will become evident from the following description of the present invention.

Applicants have discovered that it is possible to carry out the liquid-phase oxidation of saturated cycloaliphatic hydrocarbons with molecular oxygen in the presence of any excess of a boron compound insoluble in the reaction medium and at the same time to send to the subsequent processing steps a mixture which is practically free from the suspended insoluble excess boron compound, by providing a clarification phase of the crude reaction mixture before sending the latter to the subsequent processing steps. With reference to a suspension of solid particles in a liquid, by the term "clarification" we mean a process in which the solid particles are made to assemble into a restricted portion of the liquid, said portion thereby becoming enriching in the solid particles, while most of the original liquid, which thereby becomes depleted in solid particles, clears up and forms the "clarified" portion or phase of the mixture. Any method suitable for obtaining such a separation of a solid from a liquid, such as f.i. centrifuging, filtering, decanting, etc., can be used in the process of the present invention for achieving said clarification; in particular, decating proves to be a most convenient method, since it can be carried out by simply putting the crude reaction mixture through a decanter in which the linear flow speeds of the components are such as to allow a quick and complete separation of the solid in a practical manner.

In fact, the quantity of boron compound which has to be recovered from the crude reaction product is limited to only the reacted portion, that is the one actually used for blocking the produced alcohol in the form of a soluble boric ester (in the case of cyclohexane oxidation, cyclohexyl metaborate).

A further advantage is connected with the fact that the solution coming from the oxidation stage, and conveyed to the subsequent processing steps, does not contain insoluble solid parts in suspension, in consequence of which the possible formation of deposits etc. during the transfer operations of the reaction mixture is substantially reduced.

The above-mentioned objects and advantages, which will appear still more evident to those skilled in the art from the following description, are attained, according to the present invention, by a continuous liquid-phase oxidation process of simple or substituted saturated cycloaliphatic hydrocarbons having from 4 to 12 carbon atoms, by molecular oxygen and/or gases containing it, in the presence of at least one boron compound insoluble in the reaction medium, wherein a portion of the crude oxidation mixture, before being hydrolyzed and conveyed to the subsequent processing steps, is subjected to a clarification process, wherein substantially all the excess insoluble boron compound and the remaining portion of the crude reaction mixture are separated and recycled into the reactor, while the clarified portion is sent to the subsequent processing steps according to techniques known per se.

Particularly advantageous results are obtained when using an apparatus consisting of a tubular-shaped reactor at the bottom of which oxygen and/or a gas containing it, which also acts as stirring agent, and the other reacting substances (the cycloaliphatic hydrocarbon and the boron compound) are fed in concurrently. The crude reaction mixture thus obtained is first degassed, and subsequently subjected to a clarification process by means of which a clarified portion is obtained, corresponding to the real production which is subjected to hydrolysis and conveyed to the subsequent processing steps according to the per se known techniques, while the remaining portion of the crude reaction mixture, containing all the excess insoluble boron compound, inclusive of that separated from the clarified portion, is recycled into the reactor at the bottom thereof.

The process according to the present invention can be applied to the liquid-phase oxidation—according to the per se known techniques—of saturated cycloaliphatic hydrocarbons, whether simple or substituted, containing from 4 to 12 carbon atoms and more, such as, for example, cyclobutane, cyclopentane, cyclohexane, cyclooctane, cyclododecane, methyl cyclopentane, methyl cyclohexane, etc.

The process is carried out at high temperatures and under a pressure sufficient to maintain the hydrocarbon in a liquid phase.

The boron compounds generally used are those deriving from the dehydration of orthoboric acid such as, for example, metaboric acid, tetraboric acid, boric anhydride and/or mixtures thereof; other boron compounds known in the prior art can also be used advantageously.

The quantity of boron compounds to be used must be so chosen as to have a ratio of boron atoms: mols of produced alcohol equal to or higher than 1 in the reaction mixture, and preferably equal to or higher than 1.5, in order to obtain relatively high yields. Theoretically, this ratio has no upper limit, excellent results being also obtained with values ranging from 2 to 3.

The oxidizing gases usually employed are: oxygen, air and/or gases containing molecular oxygen. The invention is not limited to any particular type of apparatus; so, for example, autoclaves provided with mechanical stirrers may be used, in which the clarification chamber or zone is installed externally with respect to the oxidation chamber. Moreover, other differently shaped apparatus are suitable for the purposes of the present invention, including any arrangement whatsoever that includes a chamber or zone wherein a portion of the reaction mixture, substantially corresponding to the actual production, is thickened while the excess of boron compound fed into the oxidation stage is decanted, before being conveyed to the subsequent processing steps.

The process of this invention will be now described in more detail according to a preferred but not limiting embodiment thereof, with reference to the attached drawing which shows diagrammatically a particularly appropriate apparatus.

A tubular-shaped reactor 1 contains the reaction mixture which essentially consists of the unreacted hydrocarbon, the boric ester of the produced alcohol, minor amounts of ketones and by-products and, finally, the excess boron compound (for example metaboric acid) which is insoluble in the reaction medium and is thus suspended in same.

The reactor is fed at its bottom, through pipes 6 and 7, continuously and concurrently respectively with the hydrocarbon containing the boron compound in suspension (in a quantity substantially corresponding to that contained in the ester form in the tapped clarified portion of the reaction mixture which is sent to the subsequent processing steps) and the oxidizing gas.

The crude reaction mixture then passes from the top of the reactor into a degassing chamber 2; there the gases and the vapors are separated from the other products, and are subsequently conveyed, through the pipe 8, to the condenser 9, from which the uncondensable products (substantially nitrogen, $CO_2$, $O_2$, etc.), after suitable treatments, are discharged.

The condensed products pass into a separator 10, from the bottom of which the reaction water is discharged, while the unreacted organic phase is tapped from the top and recycled into the reactor 1.

The greater part of the crude reaction mixture thus degassed in 2 is recycled into the reactor 1 at the bottom thereof (oxidation zone) through the thickening chamber 4 by means of the pipes 3 and 5, while the remaining part, corresponding to the actual production, is subjected to a clarification in the ring-shaped zone of the clarification chamber 4.

The clarified product thus obtained is then conveyed continuously through the pipe 11 to the subsequent processing steps, while the part enriched with the insoluble boron compound (for instance metaboric acid), is recycled through the pipe 5 into the reactor 1 together with the preceding portion.

From the foregoing description, it will be apparent that apparatus of this type does not need separate mechanical equipment to keep the reaction mass stirred or agitated, since this is achieved by the fed oxidizing gas itself. Finally, it is to be noted that in industrial practice apparatus of the type described herein may be used in series, so as to provide two or more oxidation stages. In this case the clarification zone or chamber from which the production is tapped to be sent to hydrolysis and to the subsequent processing steps may be installed after the last oxidation reactor, but it is preferable to insert a clarification zone or chamber after each oxidation stage so as to avoid the transfer of mixtures containing in suspension insoluble boron compounds, thus reducing the difficulties resulting from the tendency to clog and form deposits in the system.

The invention will now be described in still more detail by the following examples, the second of which relates to the process according to the present invention, whereas in the first one (reported for comparative purposes) the clarification stage has been omitted, while maintaining the remaining operative conditions unchanged.

Unless a different indication is given, the percentages and the parts are given by weight.

EXAMPLE 1

A reactor of the same type as that represented in the attached drawing, but wherein the clarification chamber 4 was eliminated by directly connecting pipes 3 and 5, was fed with a mixture consisting of 9 parts of metaboric acid per 100 parts of cyclohexane.

2,000 parts/hour of cyclohexane, 150 parts/hour of metaboric acid and the oxidizing gas consisting of a mixture containing 5% oxygen and 95% nitrogen (by volume) were added continuously to such mixture. Contemporaneously, and through the pipe 11a, indicated by the dashed lines in the drawing, an almost equal quantity of product was discharged continuously and hydrolized with an equal weight of water.

The reaction was carried out at a temperature of 165° C. and under a pressure of 8 kg./cm.$^2$. The degree of conversion was established by regulating the feeding of the oxidizing gas so as to maintain the molar ratio metaboric acid:cyclohexanol in the reaction mixture equal to about 2.3.

The test was stopped after 100 hours. The analysis of the reaction products showed that the consumed cyclohexane amounted to 174 parts/hour corresponding to a conversion (=percent of consumed cyclohexane moles/percent of fed cyclohexane moles) of 8.7% with respect to the fed cyclohexane.

The organic oxidation phase (2035 parts/hour) obtained by hydrolysis with water of the product extracted from the reactor contained, besides small quantities of by-products, 8.26% cyclohexanol and 0.57% cyclohexanone, corresponding to a total molar yield of 86.8% with respect to the converted cyclohexane, with an alcohol:ketone weight ratio of 14.4.

The aqueous hydrolysis phase (2000 parts/hour) contained 13.0% orthoboric acid. Consequently, the ratio boron atoms/mols of cyclohexanol in the product discharged from the reactor was equal to about 2.5 and the total quantity of orthoboric acid recovered after hydrolysis and to be recycled to the dehydration phase amounted to 1.5 kg. per kg. of produced cyclohexanol+cyclohexanone.

EXAMPLE 2

In a reactor of the same type as that represented in the attached drawing, and provided with the device 4 to allow the clarification and the discharge of the production in accordance with the present invention, a test was carried out under the same conditions as those reported in the preceding example except for the fact that, in this case, the fed quantity of metaboric acid was 75.4 parts/hour, i.e. corresponding only to that which is strictly necessary for the esterification of the produced cyclohexanol.

The test was stopped after 107 hours. The analysis of the reaction products showed a cyclohexane consumption of 182 parts/hour corresponding to a conversion of 9.1% with respect to the fed cyclohexane. The organic oxidation phase (2035 parts/hour), obtained through hydrolysis with water of the product discharged from the clarification chamber contained, besides small quantities of by-products, 8.59% cyclohexanol and 0.59% cyclohexanone, equal to a total molar yield of 86.3% with respect to the converted cyclohexane, with an alcohol:ketone weight ratio of 14.5.

The aqueous hydrolysis phase (2000 parts/hour) contained 5.4% orthoboric acid. Consequently, the ratio boron atoms:moles of cyclohexanol in the clarified product leaving the reactor was nearly equal to one and the total quantity of orthoboric acid recovered through hydrolysis and to be recycled to the dehydration stage amounted to about 0.6 kg. per kg. of cyclohexanol+cyclohexanone.

It is evident, therefore, that the use of a system including a clarification zone for the production makes it possible to carry out the oxidation in the presence of even a very high excess of metaboric acid and at the same time to extract a reaction product containing a quantity of metaboric acid corresponding almost to that which is necessary for the esterification of cyclohexanol.

In this way, the conversion degree and yield being the same, the quantity of orthoboric acid to be reprocessed (hydrolysis and subsequent dehydration) is lower by about 0.9 kg./kg. of produced cyclohexanol+cyclohexanone.

Furthermore, the absence of a solid phase in the product discharged from the reactor prevents clogging or deposits in the apparatus of the system.

The operating conditions of the present invention may be varied quite widely without departing from the true spirit and scope of this invention.

What is claimed is:

1. A process for the continuous liquid-phase oxidation of cycloaliphatic hydrocarbons to alcohols comprising:
    oxidizing a cycloaliphatic hydrocarbon with molecular oxygen and/or gases containing same in the presence of a stoichiometric excess of at least one boron compound insoluble in the reaction medium,
    subjecting the crude reaction mixture coming from the reactor to clarification to form a cycloaliphatic boric ester-containing liquid phase and a phase containing unreacted insoluble boron compound,
    conveying said cycloaliphatic boric ester-containing liquid phase to hydrolysis to recover cycloaliphatic alcohols and
    recycling the phase containing unreacted insoluble boron compound to the crude reaction mixture.

2. A process for the continuous liquid-phase oxidation of cycloaliphatic hydrocarbons to alcohols comprising:
    oxidizing a cycloaliphatic hydrocarbon with molecular oxygen and/or gases containing same in the presence of a stoichiometric excess of at least one boron compound insoluble in the reaction medium in a tubular-shaped reactor wherein said molecular oxygen and/or gases containing same is introduced at the bottom of said tubular reactor and constitutes the stirring means for the reaction mixture,
    degassing the crude reaction mixture in order to remove the incondensable products as well as reaction water therefrom,
    clarifying the degassed mixture to form a cycloaliphatic boric ester-containing liquid phase and a phase containing unreacted insoluble boron compound,
    removing said cycloaliphatic boric ester-containing liquid phase for subsequent processing and recycling the phase containing unreacted insoluble boron compound into said tubular-shaped reactor at a point at or near the bottom thereof.

3. A process according to claim 1, wherein the oxidation reaction is carried out in several stages arranged in series and the clarification step takes place after the last stage of oxidation.

4. A process according to claim 1, wherein the oxidation reaction is carried out in several stages arranged in series, every stage of oxidation being followed by a clarification step.

5. A process according to claim 2, wherein the oxidation reaction is carried out in several stages arranged in series and the clarification step takes place after the last stage of oxidation.

6. A process according to claim 2, wherein the oxidation reaction is carried out in several stages arranged in series, every stage of oxidation being followed by a clarification step.

References Cited

UNITED STATES PATENTS

| | | | |
|---|---|---|---|
| 3,275,695 | 9/1966 | Marcell | 260—586 B |
| 3,324,186 | 6/1967 | Olenberg | 260—586 B |

BERNARD HELFIN, Primary Examiner

N. MORGENSTERN, Assistant Examiner

U.S. Cl. X.R.

260—617 M, 631 B, 586 B, 586 A